United States Patent
Yokota et al.

(10) Patent No.: US 6,428,454 B1
(45) Date of Patent: Aug. 6, 2002

(54) TOOL POT SEPARATION TYPE CHAIN

(75) Inventors: Hiroshi Yokota; Kazuhiko Araki; Michio Oitaka, all of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 21 days.

(21) Appl. No.: 09/632,421

(22) Filed: Aug. 4, 2000

(30) Foreign Application Priority Data

Aug. 5, 1999 (JP) .......................................... 11-222220

(51) Int. Cl.[7] .............................................. B23Q 3/157
(52) U.S. Cl. ............................. 483/68; 483/65; 483/59; 483/902; 211/1.56
(58) Field of Search .......................... 483/68, 65, 66, 483/59, 58, 902; 211/1.56

(56) References Cited

U.S. PATENT DOCUMENTS

| | | | |
|---|---|---|---|
| 3,932,924 A | * 1/1976 | Anderson | 483/68 |
| 4,616,398 A | * 10/1986 | Rutschle et al. | 483/900 |
| 4,699,276 A | * 10/1987 | Kis | 211/1.56 |
| 4,709,464 A | * 12/1987 | Speroni | 483/68 |
| 4,993,996 A | * 2/1991 | Horny et al. | 198/463.2 |
| 5,476,436 A | * 12/1995 | Klicpera | 483/68 |
| 5,688,215 A | * 11/1997 | Mase et al. | 483/66 |

FOREIGN PATENT DOCUMENTS

| | | | | |
|---|---|---|---|---|
| DE | 33 396 19 C1 | 4/1985 | | |
| DE | 0266308 A | * 3/1989 | | 483/68 |
| DE | 3732-371 A | * 4/1989 | | 483/68 |
| DE | 35 01 113 C2 | 10/1990 | | |
| DE | 297 01 719 U1 | 4/1997 | | |
| JP | 57-127643 A | * 8/1982 | | 483/68 |
| JP | 2-27834 | 4/1990 | | |
| JP | 5-93736 | 12/1993 | | |
| JP | 6-246572 A | * 9/1994 | | |

* cited by examiner

Primary Examiner—A. L. Wellington
Assistant Examiner—Erica E Cadugan
(74) Attorney, Agent, or Firm—Dann, Dorfman, Herrell and Skillman, P.C.; Henry H. Skillman

(57) ABSTRACT

A tool pot separation type chain for use in a tool magazine includes a plurality of tool pots, and a plurality of pairs of laterally spaced link plates each adjacent ones of which are connected to each other by a connection pin. Each of the pairs of link plates has a tool pot receiving section for removably receiving one of the tool pots therein. Each of the tool pots has a pair of bearings mounted thereon such that outer races of the bearings are movable in rolling contact on a guide rail or a tool pot jumping-out preventing rail provided in an opposing relationship with the guide rail in the tool magazine. With this construction, the tool pot separation type chain is able to minimizes the traveling resistance thereof during carrying of the tool pots to reduce the driving force, prevent abrasion of the tool pots and the rails and suppress generation of noise and also facilitates a carrying in or carrying out operation of each tool pot at a tool pot loading/unloading position.

3 Claims, 6 Drawing Sheets

FIG. 6
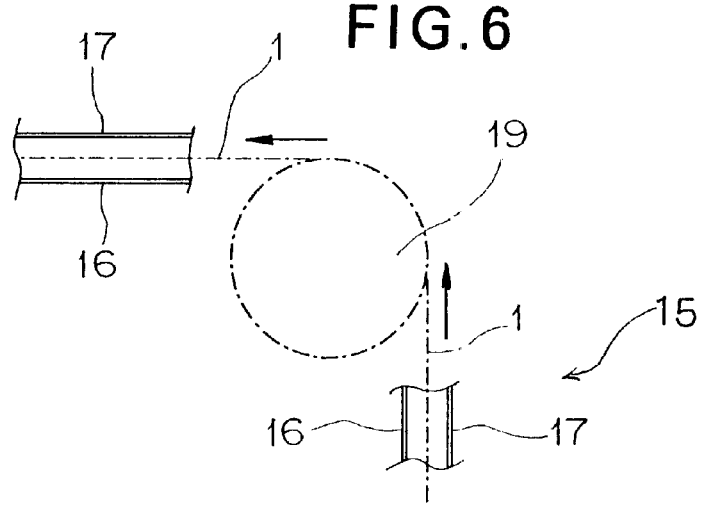
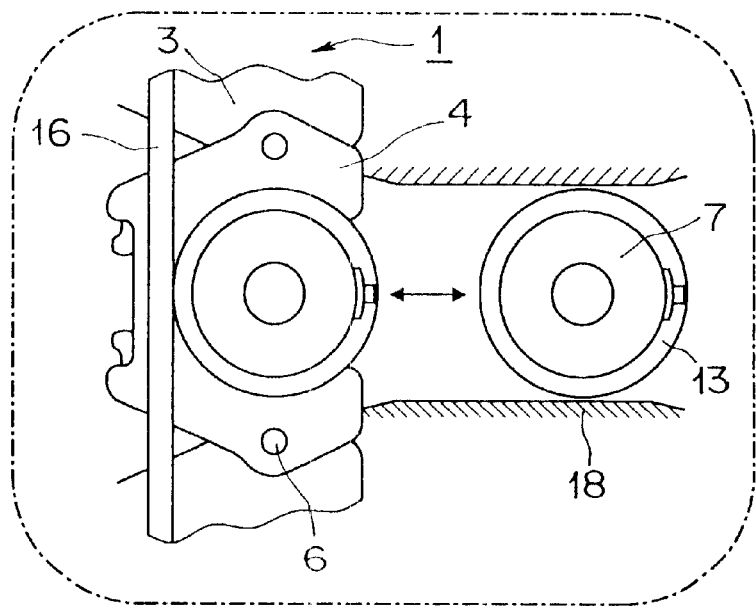
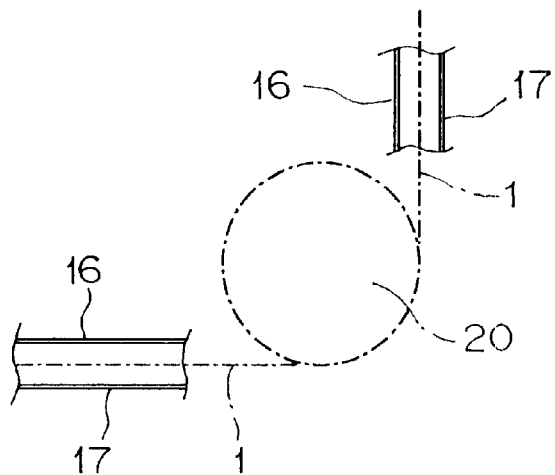

TOOL POT SEPARATION TYPE CHAIN

BACKGROUND OF THE INVENTION

1. Field of the Invention

This invention relates to a tool pot separation type chain which is used to receive, in a tool pot thereof, an exchangeable tool to be used by a machining center and feed the exchangeable tool.

2. Description of the Related Art

A tool pot separation type chain provided for a tool magazine of a machine tool such as a machining center is conventionally known and disclosed, for example, in Japanese Utility Model Laid-Open Publications Nos. Hei-2-27834 and Hei-5-93736. Particularly, the tool pot separation type chain disclosed in Japanese Utility Model Laid-Open Publication No. Hei-5-93736 is shown in FIGS. 7 and 8. Referring to FIGS. 7 and 8, the tool pot separation type chain includes a pair of link plates on which a pair of bearings of a small size are mounted, respectively, such that outer races of the bearings are moved in rolling contact on a guide rail provided for a tool magazine to carry an exchangeable tool with a reduced traveling resistance to the chain. In particular, the tool pot separation type chain 31 includes a plurality of pairs of inner and outer link plates 33 and 34 each having a tool pot receiving section in which a tool pot 32 for holding an exchangeable tool is removably accommodated. The link plates 33 and 34 in each two adjacent pairs are connected to each other by a connection pin 36 with a roller 35 disposed between the pair of inner link plates 33, 33. A receiving section center line a—a interconnecting the centers of the tool pot receiving sections of the link plates 33 and 34 coincides with a chain pitch line which is also denoted by a—a. A pin 37 extends between the link plates 33 and 34 in each pair in parallel to the connection pin 36 of the link plates 33 and 34 just below the tool pot receiving sections such that it projects outwardly from the link plates 33 and 34. A pair of small bearings 38 are fitted on the pin 37 on the exterior side of the outer link plates 34, 34. Further, a guide rail 40 along which outer races 38A of the bearings 38 roll is mounted on a tool magazine frame 39, and also a pair of tool pot jumping-out preventing rails 41A and 41B are provided on the tool magazine frame 39 in an opposing relationship to the guide rail 40 so that the tool pot 32 may not come out of the tool pot receiving sections while they are fed.

In a tool carrying apparatus provided for a tool magazine, the traveling direction of a tool pot separation type chain is usually changed or reversed by a guide roller, a sprocket wheel, a guiding curved rail or the like in a circulating path thereof such that it travels in a vertical upward or downward direction, a horizontal direction, an oblique upward or downward direction or the like. Therefore, in the conventional tool pot separation type chain 31 described above, although a tool pot moves in rolling contact with the guide rail 40 through the outer races 38A at a place where the tool pot separation type chain 31 travels horizontally on the guide rail 40, at another place along which the tool pot travels horizontally on the tool pot jumping-out preventing rails 41A and 41B after it is reversed, the tool pot travels in sliding contact with the tool pot jumping-out preventing rails 41A and 41B. Consequently, in the tool pot separation type chain 31, some tool pots always remain in sliding contact with the rails at some place along the path of circulation. As a result, the tool pot separation type chain 31 is acted upon by a high resistance to its traveling movement. Therefore, the conventional tool carrying apparatus is disadvantageous in terms of requirement for a high driving source, abrasion of a tool pot and a jumping-out preventing rail, and noise generated by a slip in sliding contact.

Further, in the tool pot separation type chain 31, when it is tried to carry in and load or carry out and unload a tool pot 32 into or from the tool pot receiving sections of the link plates 33 and 34 by means of a gripper apparatus or the like at a tool pot loading/unloading position intermediate along a vertical portion of the path of circulation of the tool pot separation type chain 31 (refer to FIG. 6), the tool pot 32 is slidably moved on a carrying in/out rail 18 which extends horizontally. Therefore, the conventional tool pot separation type chain 31 is disadvantageous in that the tool pot 32 is acted upon by high resistance to movement by the sliding contact and cannot be loaded or unloaded readily and besides a tool pot and the carrying in/out rail 18 suffer from abrasion.

The conventional tool pot separation type chain 31 is further disadvantageous in that, since the bearings 38 are mounted on the link plates 33 and 34 themselves, a great number of parts are required to mount the bearings 38, and the size of the bearings 38 is limited from two factors of the magnitudes of the link plate and the tool pot and a bearing of a large size cannot be used for the bearings 38. Furthermore, in the conventional tool pot separation type chain 31, while it moves horizontally, the force for moving the weight of tools and the tool pot 32 is assigned to the chain, and the bearings 38 mounted on the chain support the overall weight. Further, also the tensile force upon movement is assigned to the chain. Consequently, the chain is acted upon by the two forces. Accordingly, the conventional tool pot separation type chain 31 is liable to suffer from abrasion or elongation of the chain and is disadvantageous in durability. Further, in the conventional tool pot separation type chain 31, depending upon whether the chain which travels downwardly in the tool magazine thereafter changes its traveling direction upwardly around a lower corner portion or the chain which travels upwardly thereafter changes its traveling direction downwardly around an upper corner portion, the radii of curvature of rails which may be provided at such corners must be made different from each other. Further, a sprocket wheel meshes with the chain on the bearing side while another sprocket wheel meshes with the chain on the reverse side. Therefore, in order to prevent a pin for mounting a bearing from interfering with a link plate, sprocket wheels of different shapes are required.

SUMMARY OF THE INVENTION

It is an object of the present invention to provide a tool pot separation type chain which minimizes a traveling resistance thereof during carrying of a tool pot to reduce the driving force, prevent abrasion of a tool pot and a rail and suppress generation of noise, and which facilitates a carrying in or carrying out operation of a tool pot at a tool pot loading/unloading position.

In order to attain the object described above, according to the present invention, there is provided a tool pot separation type chain for use in a tool magazine having a guide rail and a tool pot jumping-out preventing rail provided in an opposing relationship with each other along a circulating traveling path of the chain. The chain comprises a tool pot, and a plurality of pairs of laterally aligned link plates each adjacent ones of which are connected to each other by a connection pin, each of the pairs of link plates having a tool pot receiving section for removably receiving therein the tool pot. The tool pot has at least one bearing mounted thereon, and the bearing has an outer race movable in rolling contact on the guide rail or the tool pot jumping-out preventing rail of the tool magazine.

In one preferred form of the present invention, the link plates each have a pair of grip fingers pivotally mounted thereon and disposed on opposite sides of the tool pot receiving section, and a spring member acting between the grip fingers and urging them toward each other so that the tool pot received in the tool pot receiving section is held by and between the grip fingers under a biasing force of the spring member.

It is preferable that the tool pot has an outer peripheral surface formed with two pairs of recesses, and the grip fingers has a pair of hooks provided at respective free ends thereof and lockingly engageable with each pair of recesses.

In the tool pot separation type chain, the outer race of the bearing provided on the tool pot moves in rolling contact on the guide rail or tool pot jumping-out preventing rail provided in the tool magazine. Consequently, a great number of tools to be exchanged and the tool pot can be carried by a comparatively low driving force without generation of noise.

More specifically, since the bearing whose outer race moves in rolling contact with the guide rail or tool pot jumping-out preventing rail provided in the tool magazine is mounted on the tool pot which is removably received in each of the tool pot receiving sections of the link plates, at a place where the tool pot separation type chain travels in a horizontal direction in a circulating path thereof, the outer race of the bearing moves in rolling contact on the guide rail or tool pot jumping-out preventing rail. Consequently, the moving resistance to the tool pot separation type chain in the horizontal direction can be reduced. Consequently, since the tool pot separation type chain involves no sliding contact with any member including the guide rail and the tool pot jumping-out preventing rail along the circulating path thereof, the tool pot separation type chain can be driven with a comparatively low driving force. As a result, abrasion of the tool pot and rails and generation of noise can be prevented.

When a tool pot is loaded or unloaded in a horizontal direction at a tool pot loading/unloading position along a vertical traveling path of a tool pot separation type chain, in the conventional tool pot separation type chain described hereinabove, since no bearing is provided on the tool pot itself, the tool pot moves in sliding contact on a carrying in/out rail so as to be carried out or in, and consequently, the resistance to the movement is high and the carrying in/out operation of the tool pot is difficult and besides noise is generated. However, in the tool pot separation type chain of the present invention, since the bearing is provided on the tool pot, the outer race of the bearing moves in rolling contact on a tool pot carrying in/out rail provided horizontally. Consequently, the resistance to the movement is low, and reduction of the driving force for the movement can be achieved. Further, abrasion of the tool pot and the carrying in/out rail and generation of noise upon loading/unloading of a tool pot can be reduced, and the carrying in/out operation of a tool pot can be performed readily.

Further, since the bearing is mounted on the tool pot itself, the number of parts can be reduced when compared with the alternative arrangement wherein a bearing is mounted on each link plate. Consequently, the tool pot separation type chain can be produced readily and simply. Furthermore, when the tool pot separation type chain moves in a horizontal direction along the circulating path thereof, the weight of a tool and a tool pot and the weight of the chain are supported by the bearings provided on the tool pot, and the tensile force upon movement is supported by the chain. Since the individual forces are assigned separately to the tool pot side and the chain side in this manner, the tensile force to act upon the chain can be minimized. Consequently, elongation of the chain by abrasion can be reduced and the durability of the chain can be achieved.

In addition, different from the conventional separation type chain wherein bearings are mounted on a pin which extends through a pair of link plates, the tool pot separation type chain of the present invention does not include a pin for mounting a bearing and the bearing is provided on the tool pot itself. Consequently, both where the chain which travels downwardly in the tool magazine turns around a lower corner portion and changes its advancing direction to the upward direction and where the chain which travels upwardly turns around an upper corner portion and changes its advancing direction to the downward direction, the radii of curvature of the rails provided at the corner portions need not be made different from each other. Also sprocket wheels provided at the corner portions need not be made different from each other in configuration.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 6 is a schematic view showing the tool pot separation type chain of FIG. 1 traveling along a path of circulation around a tool magazine and showing, in an enlarged scale, a tool pot loaded into or unloaded from the tool pot separation type chain at a tool pot loading/unloading position;

DESCRIPTION OF THE PREFERRED EMBODIMENT

Figure 1:
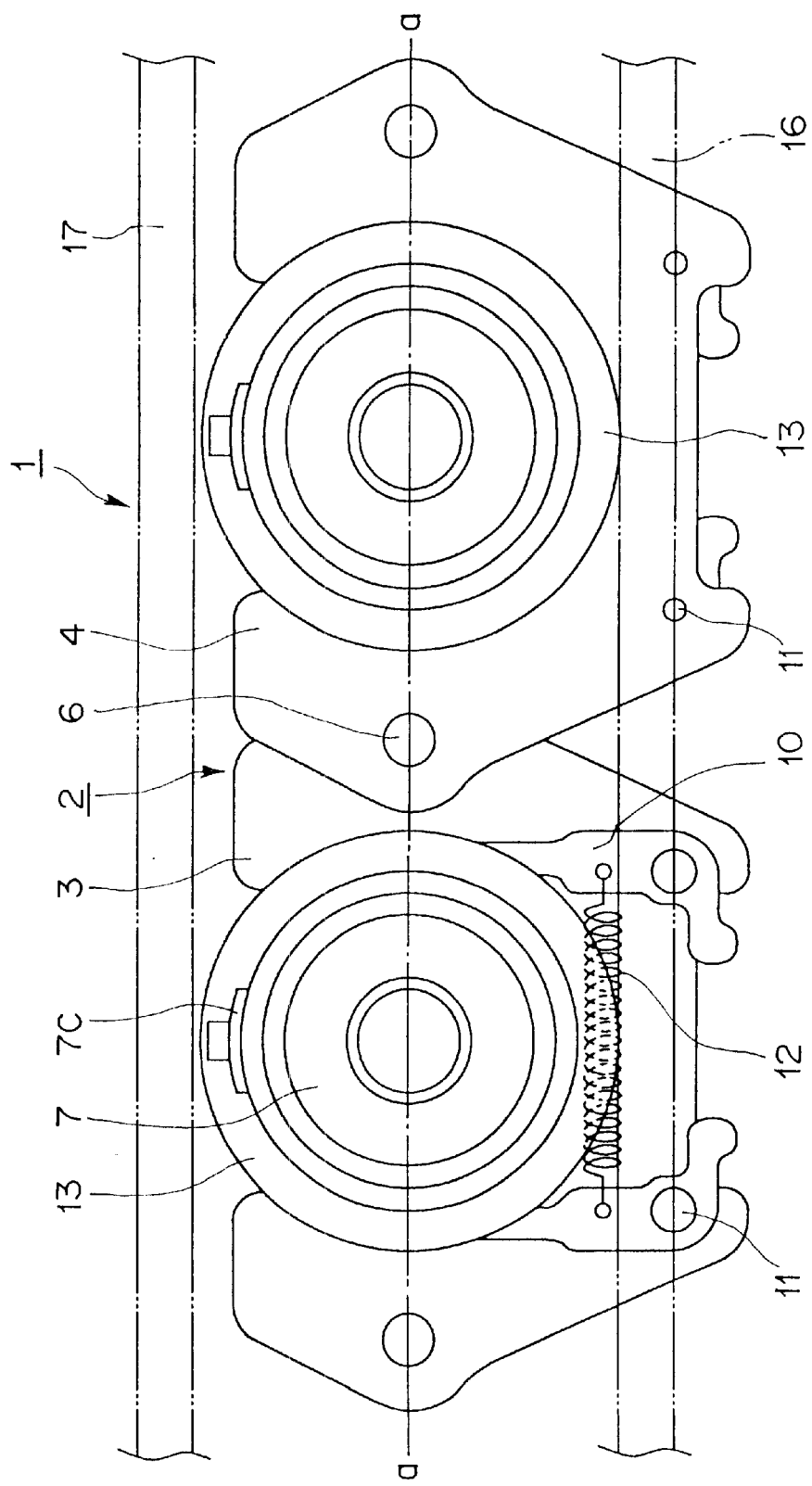
FIG. 1 is a fragmentary side elevational view of a tool pot separation type chain to which the present invention is applied.
Figure 2:
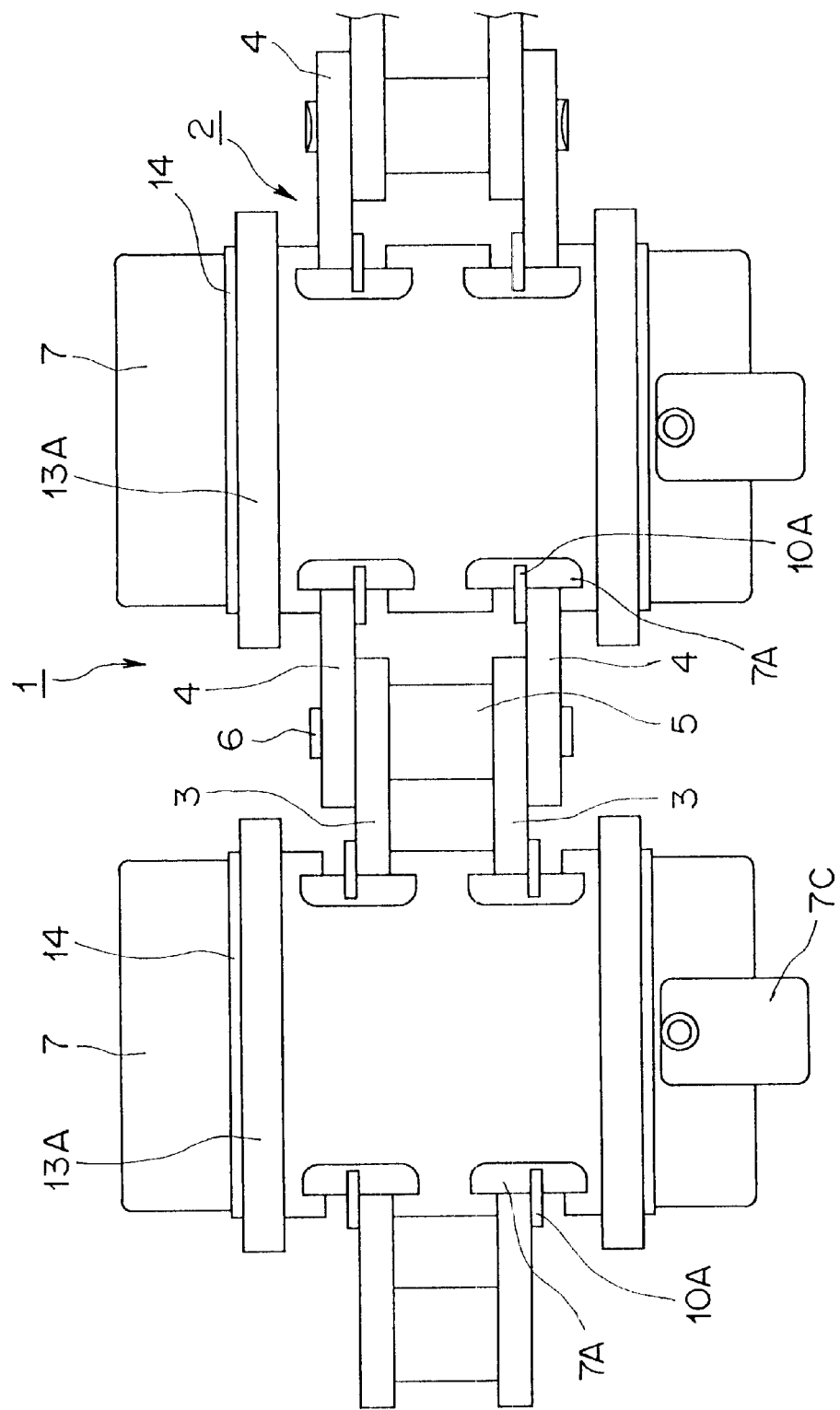
FIG. 2 is a top plan view of the tool pot separation type chain of FIG. 1.

Referring to FIGS. 1 to 6, there is shown a tool pot separation type chain to which the present invention is applied. The tool pot separation type chain is generally denoted at 1 and includes a chain 2 which in turn includes a plurality of pairs of opposing inner link plates 3 and opposing outer link plates 4 each connected to each other by a connecting pin 6 while rollers 5 are held between the inner link plates 3, 3. Each of the inner link plates 3 and outer link plates 4 has a recess 3A or 4A (FIG. 4) formed thereon. A tool pot receiving section 8 for receiving a tool pot 7 therein is formed from recesses 3A of each opposing ones of the inner link plates 3, and a tool pot receiving section 9 for receiving a tool pot 7 therein is formed from recesses 4A of each opposing ones of the outer link plates 4.

Each of the inner link plates 3 and the outer link plates 4 has a pair of grip fingers 10 mounted for pivotal motion thereon. Each of the grip fingers 10 has a hook 10A provided at a free end thereof. A spring member 12 such as a tension coil spring is connected between portions of a pair of the grip fingers 10 of each of the inner link plates 3 and the outer link plates 4 in the proximity of pivot pins 11 so that a tool pot 7 received in the tool pot receiving section 8 or 9 may be held by and between the grip fingers 10 under a contracting biasing force of the spring member 12.

In the tool pot receiving section 8 or 9 of each of the inner link plates 3 or 4, a tool pot 7 is received such that it extends in parallel to the connecting pin 6 and the opposite ends of it project outwardly from the opposing link plates 3 or 4, and a bearing 13 is mounted at each of the projecting portions of the tool pot 7 and fastened to the tool pot 7 by a ring 14. Further, recesses 7A for interlocking engaging with the hooks 10A are formed at axial intermediate portions of an outer peripheral surface of each tool pot 7. The recesses 7A are engaged by the hooks 10A of the associated grip fingers 10 biased toward each other by the spring members 12 so that the tool pot 7 may be arrested by the grip fingers 10. In the tool pot separation type chain 1 having the construction described above, a receiving portion center line a—a interconnecting the centers of tool pot receiving sections 8 and 9 is aligned with a chain pitch line which is denoted also by a—a. It is to be noted that each of the tool pots 7 includes steel balls 7B (FIG. 3) urged by springs 7B' for engaging with a stepped portion of a tool holder (not shown) inserted in the tool pot 7 to arrest the tool holder, and a guide member 7C for being inserted into and guiding the tool holder.

A tool magazine 15 (FIGS. 3 and 6) includes a frame 15A having a pair of guide rails 16 and a tool pot jumping-out preventing rail 17 provided at suitable locations of a circulating traveling path of the chain 2. The tool pot separation type chain 1 travels between the guide rails 16 and the tool pot jumping-out preventing rail 17 such that outer races 13A of the bearings 13 contact with the guide rails 16 or the tool pot jumping-out preventing rail 17. The tool pot jumping-out preventing rail 17 is provided to prevent a tool pot 7 from jumping out inadvertently from the tool pot separation type chain 1 during traveling of the tool pot separation type chain 1.

Figure 3:
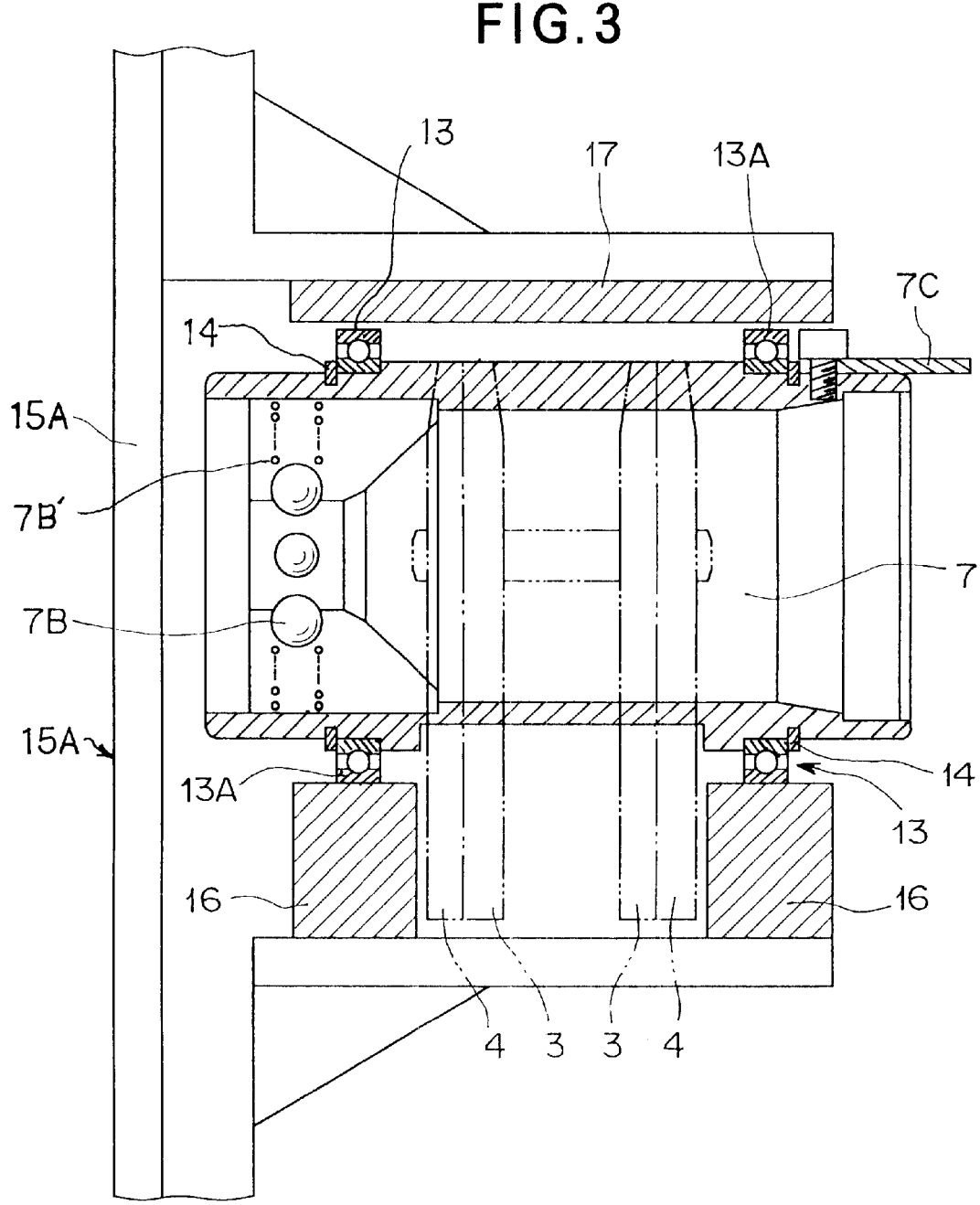
FIG. 3 is a vertical sectional view of the tool pot separation type chain of FIG. 1.
Figure 4:
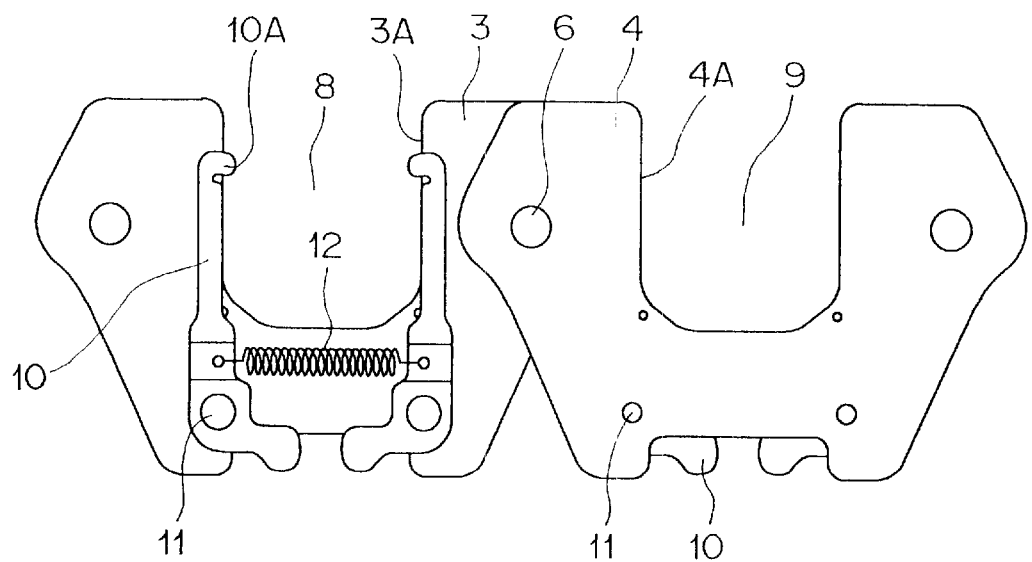
FIG. 4 is a partial side elevational view of the tool pot separation type chain of FIG. 1 before a tool pot is fitted.
Figure 5:
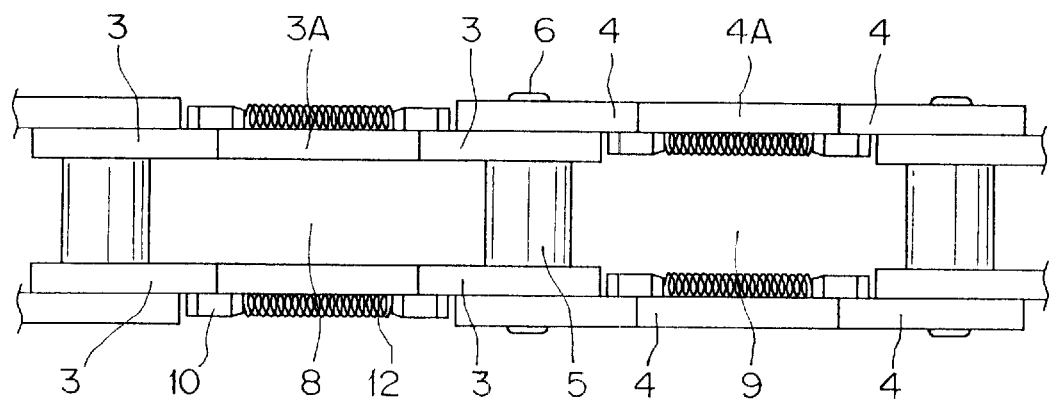
FIG. 5 is a top plan view of the tool pot separation type chain shown in FIG. 4.
Figure 7:
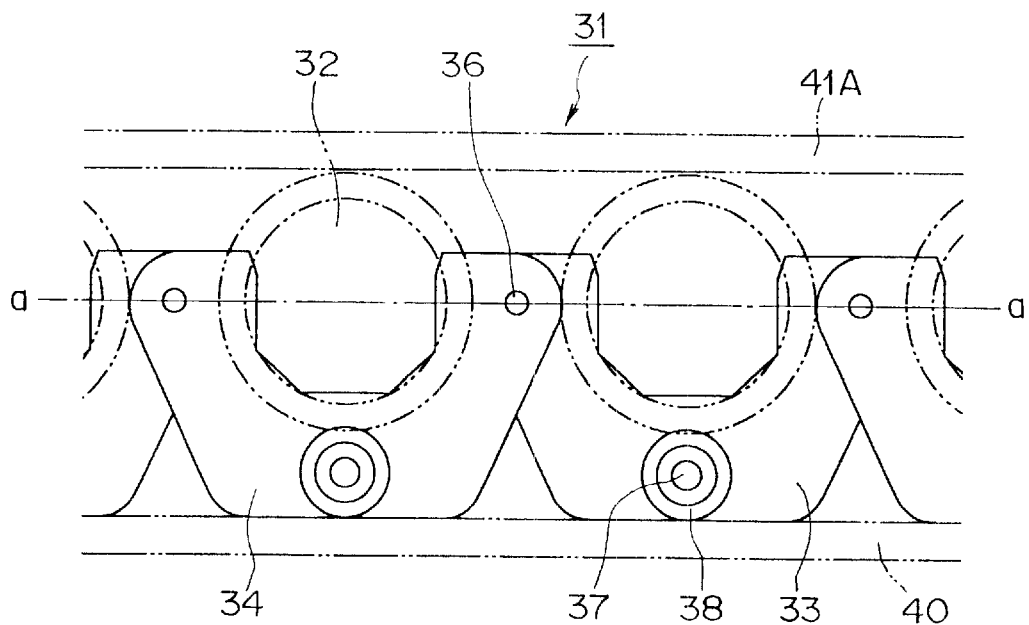
FIG. 7 is a partial side elevational view of a conventional tool pot separation type chain.
Figure 8:
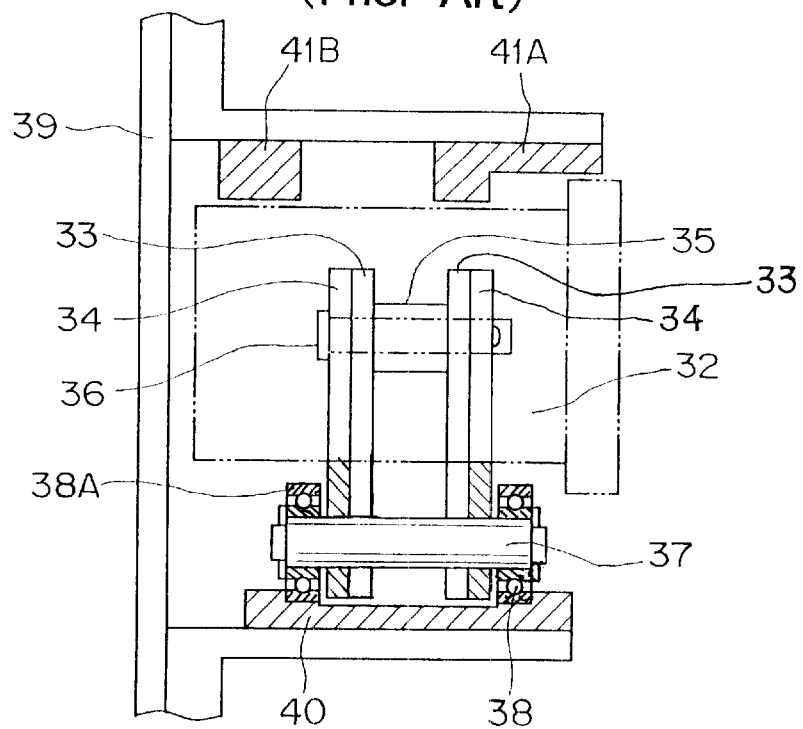
FIG. 8 is a vertical sectional view of the tool pot separation type chain of FIG. 7.

The tool pot separation type chain 1 having the construction described above is driven by a drive mechanism not shown in accordance with an instruction of an NC apparatus such that the chain 2 is moved to travel along the circulating path while tool pots 7 having tools not shown are accommodated in the tool pot receiving sections 8 and 9. Here, when the tool pot separation type chain 1 travels in a horizontal direction above the tool magazine as shown in FIG. 6, the chain 2 travels on the guide rails 16 while the outer races 13A of the bearing 13 are in rolling contact with the guide rails 16 as shown in FIG. 1. In this instance, as shown in FIGS. 1 and 3, the outer races 13A are rolled on the guide rails 16 without being locked because a clearance is provided between the tops of the outer races 13A of the bearing 13 and the tool pot jumping-out preventing rail 17.

On the other hand, when the tool pot separation type chain 1 travels in a horizontal direction below the tool magazine in FIG. 6, the chain 2 travels on the tool pot jumping-out preventing rail 17 such that the outer races 13A of each bearing 13 are in rolling contact with the tool pot jumping-out preventing rail 17. Also in this instance, the outer races 13A are rolled on the tool pot jumping-out preventing rail 17 without being locked because a clearance is provided between the tops of the outer races 13A of each bearing 13 and the guide rails 16.

In this manner, when the chain 2 is moved in a horizontal direction along the circulating path, the outer races 13A of the bearings 13 provided on each tool pot 7 are rolled on the guide rails 16 or tool pot jumping-out preventing rail 17, so that the moving resistance upon traveling of the chain 2 is low. Further, since the overall weight of the tool pot 7 and the tool are assigned to the bearings 13, the tensile force applied to the chain 2 can be reduced, and consequently, the driving force for the chain 2 can be reduced. Further, when the tool pot separation type chain 1 changes its traveling direction along the circulating path in the tool magazine, since a sprocket wheel provided at the corner location always meshes with the rollers 5 provided on the connecting pins 6 which form the chain 2, sprocket wheels of the same shape can be provided at all such corner positions, that is, sprocket wheels of different shapes need not be used.

Further, with the tool pot separation type chain 1, a tool pot 7 is loaded into or unloaded from the tool pot separation type chain 1 in a horizontal direction parallel to the floor or ground at a tool pot loading/unloading position along the circulating path. Such loading/unloading is described with reference to FIG. 6 in which the tool pot separation type chain 1 at the loading/unloading position is shown in an enlarged scale. The tool pot separation type chain 1 travels upwardly in a vertical direction and stops when a tool pot 7 to be exchanged comes to the loading/unloading position. At the loading/unloading position, the grip fingers 10 mounted for pivotal motion on the inner link plate 3 by the pivot pins 11 are pushed at rear end portions thereof which are opposite from the hooked free ends, and thereupon, the free ends of the grip fingers 10 are pivotally opened against the contacting biasing force of the spring member 12 so that the hooks 10 thereof are brought out of engagement with the recesses 7A formed on the tool pot 7 to release the tool pot 7. In this state, the tool pot 7 is pulled out from the tool pot receiving section 8 and carried out along the carrying in/out rail 18 provided horizontally. In this instance, since the outer races 13A of the bearings 13 of the tool pot 7 are rolled in rolling contact on the carrying in/out rail 18, the moving resistance is low and also the tensile force applied to a carrying out chain (not shown) is low, and consequently, the carrying out operation is performed readily. Then, another tool pot 7 is carried in along the carrying in/out rail 18. Also upon such carrying in, the outer races 13A of the bearings 13 are rolled on the guide rails 16. Consequently, the tool pot 7 is carried in readily and received into the tool pot receiving section 8, and then the hooks 10A of the grip fingers 10 are brought into engagement with the recesses 7A formed on the tool pot 7 under the contracting biasing force of the spring member 12 so that the tool pot 7 is held in position against removal from the tool pot receiving section 8. Then, the chain 2 starts its traveling. It is to be noted that reference numeral 19 in FIG. 6 denotes a sprocket wheel, and 20 a guide roller. Further, insertion of a tool holder into a tool pot 7 is performed at an arbitrary location along the circulating path.

While a preferred embodiment of the present invention has been described using specific terms, such description is for illustrative purposes only, and it is to be understood that changes and variations may be made without departing from the spirit or scope of the following claims.

What is claimed is:

1. A tool pot separation chain for use in a tool magazine having a guide rail and a tool pot jumping-out preventing retention rail spaced from said guide rail, said guide rail and said retention rail being parallel in an opposing relationship and defining a circulating traveling path for the chain, said chain comprising:

at least one tool pot; and a series of pairs of link plates, the link plates in each pair arranged along said path, the link plates of each pair being connected to each other by a connecting pin, and having a tool pot receiving section for removably receiving therein one of said at least one tool pot, said connecting pin having an axis perpendicular to said parallel guide and retention rails, said at least one tool pot being received in said receiving sections of said pairs of links and extending beyond said link plates in a direction parallel to the axis of the respective connecting pin, so as to provide a projecting end portion at each end of said at least one tool pot; and at least one bearing mounted on each of said projecting portions, said at least one bearing having a cylindrical outer race with an outside surface having a diameter less than the spacing between the guide rail and the retention rail and movable in rolling contact either on the guide rail or on the retention rail of the tool magazine, the outside surface of said bearings being centered on a common axis parallel to the axis of the respective connecting pin.

2. A tool pot separation chain according to claim 1, wherein each of said link plates has a pair of grip fingers pivotally mounted on the link plate and having free ends disposed on opposite sides of the respective tool pot receiving section, and a spring member with a biasing force operable to act on said grip fingers and urge said free ends toward each other, said free ends having end portions remote from said pivotal mounting to engage the at least one tool pot in said receiving section and hold said at least one tool pot under the biasing force of said spring member.

3. A tool pot separation type chain according to claim 2, wherein said at least one, tool pot has an outer peripheral surface formed with two pairs of recesses, the end portions of said grip fingers having hooks lockingly engageable with each pair of recesses.

\* \* \* \* \*